United States Patent [19]
Howery et al.

[11] Patent Number: 5,626,761
[45] Date of Patent: May 6, 1997

[54] CHEMICAL AND PARTICULATE FILTRATION SYSTEM/APPARATUS

[75] Inventors: Kenneth A. Howery, Martinsville; John W. Howery, South Orange, both of N.J.

[73] Assignee: Poly-Bio-Marine, Inc., South Orange, N.J.

[21] Appl. No.: 169,668

[22] Filed: Dec. 17, 1993

[51] Int. Cl.⁶ ............................................. B01D 61/00
[52] U.S. Cl. .................. 210/651; 210/650; 210/653; 210/654; 210/335; 210/340; 210/288; 210/440
[58] Field of Search .................. 210/651, 641, 210/653, 654, 257.2, 263, 650, 490, 195.2, 500.35, 500.38, 288, 252, 268, 201, 291, 195.1, 340, 335, 440; 264/41

[56] References Cited

U.S. PATENT DOCUMENTS

| | | | |
|---|---|---|---|
| T921,001 | 4/1974 | Devaney | 210/641 |
| 2,944,017 | 7/1960 | Cotton | 210/500.3 |
| 4,076,619 | 2/1978 | Howery | 210/169 |
| 4,242,159 | 12/1980 | Klimmek et al. | 210/506 |
| 4,276,177 | 6/1981 | Smith | 210/195.2 |
| 4,366,068 | 12/1982 | Ostreicher et al. | 210/500.2 |
| 4,431,545 | 2/1984 | Pall et al. | 210/641 |
| 4,523,995 | 6/1985 | Pall et al. | 210/504 |
| 4,548,716 | 10/1985 | Boeve | 210/652 |
| 4,565,628 | 1/1986 | Arnaud | 210/252 |
| 4,615,800 | 10/1986 | St. Felman et al. | 210/340 |
| 4,620,932 | 11/1986 | Howery | 210/490 |
| 4,655,928 | 4/1987 | Milton et al. | 210/195.2 |
| 4,786,420 | 11/1988 | Dalessandro | 210/252 |
| 5,024,763 | 6/1991 | Schlaginhaufen | 210/340 |
| 5,354,464 | 10/1994 | Slovak et al. | 210/288 |

*Primary Examiner*—Ana M. Fortuna
*Attorney, Agent, or Firm*—Hoffmann & Baron

[57] ABSTRACT

A chemical and particulate filtration system and method are disclosed. The method includes contacting a liquid to be filtered, in a reverse flow manner, with a molecular absorption filter media and a submicronic filter media. The system/method removes, as a particulate, dissolved organic and inorganic contaminants, pollutants and particulate from a liquid. The removal of contaminants is evidenced by a color change in the filter media.

16 Claims, 4 Drawing Sheets

CHEMICAL AND PARTICULATE FILTRATION SYSTEM/APPARATUS

BACKGROUND OF THE INVENTION

The present invention relates to a liquid filtration system and method for removing dissolved organic and inorganic contaminants and pollutants and particulate matter from a liquid.

Prior art filtration devices include activated carbon, ion-exchange resins, polymeric absorbents, submicron membranes and other filter media. Filtration devices containing activated carbon, ion-exchange resins, macro-reticulated styrene, and other polymeric absorbents are only capable of filtering at very slow filtration rates. In addition, oftentimes known filtration systems require considerable pre-filtration to prevent filter media blinding due to particulate, colloidal and protein coating of the filtration media. Submicronic filtration media and devices require considerable fluid pressure. The pores of the materials of construction of submicronic media are quickly blinded or clogged. In addition, when these prior art filtration devices are used in combination, the flow rates and differential pressures are set by the last in-line filter. If the last in-line filter is a filter utilizing standard submicronic membrane technology, flow rates can be as slow as milliliters per minute per square foot of membrane surface area. Prior art filtration devices have limited applications, short life spans and expensive replacement costs.

Some conventional state-of-the-art technology employing granular or spherical shaped filter media are subject to tunneling at high flow rates. In addition, conventional granular or spherical shaped filter media encapsulated in non-woven fibers by acrylic binders, have reduced absorption capacity because many of the pores are closed by the acrylic binder. Each of the above granular or spherical shaped filter media, if combined with state-of-the-art membrane technology result in very low flow rates and high differential pressures. These low flow rates and high differential pressures produce high sheer forces which cause elution of sorbate solutes and severely limit the function, in a short period of time, of these state-of-the-art chemical filtration media.

A major problem associated with conventional filtration systems confronting American industry, has been the high cost of replacing fouled ion-exchange resins and reverse osmosis (RO) membranes. Ion-exchange resins and RO membranes are subject to permanent fouling when they become coated with colloids and colloidal suspensions. High concentrations of metallic ions and organic carbons also foul ion-exchange resins and RO membranes.

Another problem associated with conventional filtration systems is the removal of dissolved organic contaminants in potable water. Dissolved organic contaminants are undesirable in potable water. These dissolved organics are generated by rainwater runoff, entropy and other environmental disturbances, and can be found in potable water from community and regional reservoirs. Dissolved organic contaminants also interfere with various manufacturing processes which require water containing low levels of dissolved organics. Traditional filtration technology including carbon filters, carbon-exchange resins, ion-exchange resins, micro-filters, diatomaceous earth filters and combinations of these filters have proven unsuccessful for removing dissolved organic contaminants from potable water and water used in manufacturing processes.

Recent advances in filtration technology including Zeta charged filters, Zeta charged diatomaceous earth filters and low molecular weight membrane ultra filtration (300 MW) reverse osmosis filters have also proved inadequate to the task of removing undesirable dissolved organics from potable water systems. Zeta charged filters require additional pre-filters which blind too quickly. In addition, the Zeta-filtered water was found to contain dissolved organic contamination. Zeta charged diatomaceous earth filters also proved to be inadequate due to slow filtration rates, rapidly blinded filter media, and the filtrate contained unacceptable levels of contaminants. Reverse osmosis (RO) systems (300 MW) also gave unacceptable results due to rapid fouling of the pre-filters and fouling, within 48 hours, of the RO membrane with organics. Further, the maximum water filtrate in a 24 hour period, under adverse conditions including high levels of metal ions, colloidal suspensions, suspended solids and dissolved organics, is generally less than 10,000 gallons at a prohibitive operating cost of about 2,400–3,000 dollars per day for membrane and filter media replacements.

Conventional carbon filters are generally unable to remove toxic contaminants at flow rates above 5 gal/min/square foot of carbon. Carbon filters also undergo rapid desorbing of the toxic contaminants from the carbon media back into the filtrate. Carbon filter media may also experience phosphate leaching in the range of 5–10 mg/l causing microalgae growth in water pipes and clogged particulate pre-filters in tap water supplies.

Conventional filtration technology is also unable to remove substances which have been added to potable water during municipal water processing. Many municipal water utilities add polyphosphates and water soluble polymers to their potable water systems. The polyphosphates and water soluble polymers prevent mineral plating on transport piping. Conventional filters have proven unacceptable for the removal of polyphosphates and water soluble polymers from potable water before consumption. Simple micron particle filtration results in blinding of the filter media in a short period of time. Particle filtration (micron), in combination with carbon filtration, also results in a low quality filtrate. The filtrate was loaded with phosphate, dissolved organics and particulate. In addition, Zeta charged diatomaceous earth filters are blinded rapidly so that phosphate and dissolved organics by-pass the media and remain in the filtrate. The membranes of reverse osmosis filters are rapidly clogged, and consequently permit by-pass of phosphates and metallic ions.

U.S. Pat. No. 4,076,619 to Howery discloses hydrophilic polymeric formulations which, when applied to various matrix materials, act as filters by means of molecular absorption chemical filtration in both marine and fresh water systems. Howery further discloses application of hydrophilic polymeric materials as a film-forming coating and as a pellet form of filtration media.

U.S. Pat. No. 4,620,932 to Howery discloses a one-piece construction continuous matrix submicronic filter media capable of high volume filtration of submicronic sized particulate from fluids. The submicronic filter media does not require the addition of wetting agents, solvents, added electrical charge enhancers or elevated pressure differentials to maintain flow rates of 20–150 gallons/minute (gal./min., GPM) at absolute particle micron ratings as low as 0.1.

While there have been attempts to develop filtration systems which employ high flow rates for the removal of organic and inorganic solutes and particulate from liquids, these approaches often lack the efficiency necessary for practical implementation. Typical problems encountered in using state-of-the-art filtration systems employing high flow rates are blinding and clogging of the filter media, by-passing of dissolved organic and inorganic solute contaminants and expensive filter media replacement costs. Consequently, there is a need for alternative high flow rate filtration systems for the removal of organic and inorganic solutes which address the problems typically associated with high flow rate filtration systems.

It is therefore an object of the present invention to provide a filtration system and method for the efficient, continuous and economic removal of dissolved pollutants and contaminant particulate at flow rates thousands of time greater than submicron membrane and other state-of-the-art filtration media and devices.

It is a further object of the present invention to provide a filtration system/method having the flexibility for application with liquids of varying viscosity, from that of heavy petroleum to that of water.

SUMMARY OF THE INVENTION

The present invention is a sequential reverse flow continuous type filtration apparatus for high flow rate removal of organic and inorganic solutes and particulate from a fluid sample. The apparatus includes a first filtration unit which contains a molecular absorption filter media for removing organic and inorganic solutes. In addition, the apparatus contains a second filtration unit which is arranged downstream from and connected to the first filtration unit and has a submicronic filter media for removing particulate. Flow rates of greater than 40 gallons per minute at an absolute particle micron rating as low as 0.1 and a pressure differential less than 15 psi are possible with the sequential reverse flow continuous type filtration apparatus of the present invention.

The molecular absorption filter media is made of a material formed from a composition of 48 to 62 weight percent water; 10 to 18 weight percent of an aqueous solution containing 70 weight percent of a polymer made of 60 to 95 weight percent of at least one alkylacrylate or alkylmethacrylate and 5 to 40 weight percent acrylic acid; 14 to 22 weight percent of a forty percent by weight solids, prepolymer solution; 2.5 to 7.2 weight percent of a 3 percent by volume ammonia solution; and 3.5 to 7.2 weight percent of an epoxy resin.

The submicron filter media is a one-piece construction of a continuous matrix material having an initial micron rating of from about 1 to about 5 microns. A hydrophilic terpolymer is impregnated on the matrix material by step-wise addition of a low-viscosity terpolymeric polymerization mixture of from 10% to about 14% by weight of a polymer which includes at least one of alkylacrylate and alkylmethacrylate and acrylic acid; from about 17% to about 22% by weight polyethyleneimine and urea solution; from about 7% to about 10% by weight ammonia; and from about 2% to about 6% by weight epoxy resin. The polymerization mixture has a solids content of from about 15% to about 20% by weight prior to polymerization. The step-wise addition to saturate the matrix material with the terpolymeric mixture is followed by compressing the saturated matrix material, and repeating the saturation and compression at least one additional time until the saturated weight of the matrix is from about 4 to about 6 times the dry weight per cubic inch of matrix. The saturated matrix material is dried in a first stage drying in which the moisture removal from the saturated matrix is from about 40% to about 60% followed by a second stage drying wherein the moisture in the saturated matrix is reduced to about 2%.

The apparatus provides for the removal of organic and inorganic solutes from a fluid. The organic and inorganic solutes may have a particle size of less than 0.1 micron. The apparatus causes the solutes to aggregate into particles having a size of at least 0.1 micron. The solutes are then removed as particulate.

The apparatus also provides for the visible identification of the removal of a particular contaminant. The removal of contaminants is evidenced by color changes in the molecular absorption filter media and the submicron filter media.

A method is also provided for high flow rate filtration which removes organic and inorganic solutes and particulate. The filtration method is a sequential reverse flow filtration of a substance by contacting it with a first filtration unit having a molecular absorption filter media and a second filtration unit having a submicron filter media, such that organic and inorganic solutes are removed as particulate. The filter media cause the organic and inorganic solutes having a particle size of less than 0.1 micron to aggregate into particles at least 0.1 micron in size for removal as particulate. Flow rates of greater than 40 gallons per minute at an absolute particle micron rating as low as 0.1 and a pressure differential less than 15 psi are possible with the sequential reverse flow continuous type filtration method of the present invention.

The method also provides for the visible identification of the removal of a particular contaminant. The removal of contaminants is evidenced by color changes in the molecular absorption filter media and the submicron filter media.

The present invention offers many advantages over conventional filtration systems and methods. The present invention provides a physically compact filtration system, unique in design, efficient in operation, and suitable for a broad spectrum of industrial, medical, scientific and other applications which require removal of organic and inorganic pollutants and particulates to 0.1 absolute micron levels at flow rates thousands of times greater than known filtration equipment and systems.

In a preferred embodiment, the present invention provides optically clear filter canisters and media containment devices which allow visual observation of filter media discoloration permitting the identification of materials being removed from liquids by the invention and filtration media saturation and indicates the need for filter media replacement.

The present invention offers a physical design which meets both FDA and EPA standards and which permits use of environmentally safe materials of construction.

Use of the invention lowers initial and replacement costs of filtration systems by 20 to 50 times that of known filter media and other filtration materials, devices and/or apparatus. Replacement of the filter media in the present invention is quick, simple, clean, and inexpensive in contrast to known systems and products.

For a better understanding of the present invention, reference is made to the following description, taken together with the accompanying drawings, the scope of which will be pointed out in the appended claims.

DETAILED DESCRIPTION OF THE INVENTION

Figure 1:
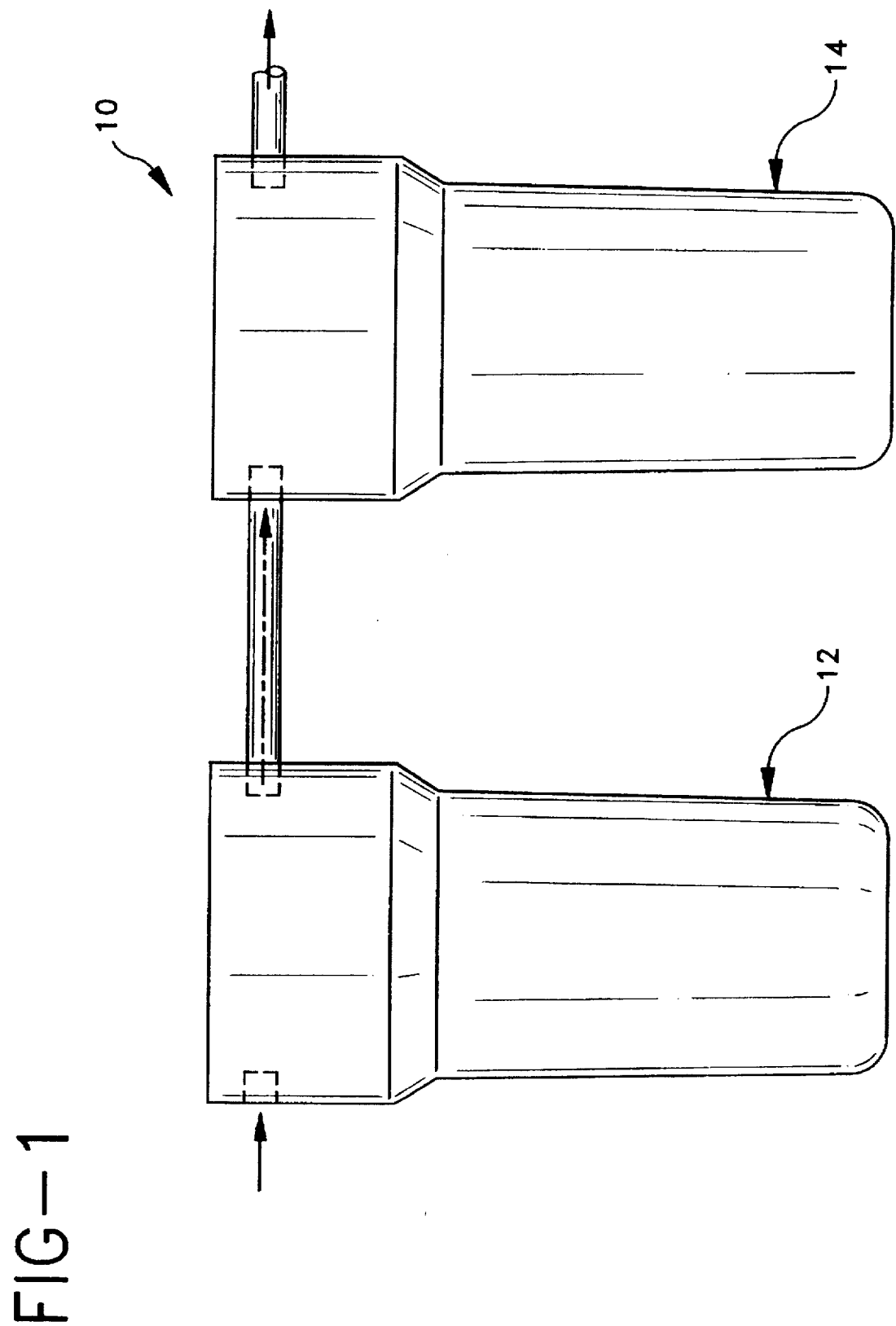
FIG. 1 is a elevational view of the filtration system of the present invention.

A chemical and particulate filtration system/apparatus 10, as shown in FIG. 1, includes at least two parts, a molecular absorption (chemical) filtration media unit 12 and a submicronic (particulate) filtration media unit 14 arranged for optimum filtration of liquids. Further, the sequence shown in FIG. 1, for passing the liquid to be filtered through the molecular absorption filter media, followed by passage through the submicronic filter media is a preferred embodiment. This arrangement removes dissolved pollutants (organics and inorganics) from the liquid, prior to passing the processed liquid into the submicronic filtration media, to provide a liquid filtrate with submicronic clarification. The filtrate has submicronic sterility and is free of total organic compounds (TOCs) less than 200 µg/l (ppb), volatile organic compounds (VOCs) less than 5 µg/l (ppb), metals, organic and inorganic phosphate, pesticides, other dissolved organics and inorganics and its total hardness remains unchanged.

In particular, the molecular absorption unit 12 of the chemical and particulate filtration system 10 includes an inlet port 46 and an outlet port 50. The outlet port 50 of the molecular absorption filtration unit 12 is connected to the inlet port 52 of the submicronic filtration unit 14. The submicronic filtration unit 14 has an outlet port 54 for the exit of a filtered liquid. The filter housings used for the chemical and particulate filtration system 10 must be able to be arranged for reverse direction flow of the liquid to be filtered.

In conventional filtration devices, a liquid to be filtered surrounds the filter media and is drawn up through the center of the media. The filtrate exits a filtration unit from the center of the device. In contrast, the flow of liquids through the present invention, as shown in FIGS. 1–4, is the reverse of that found in conventional filter devices. Reverse flow can be defined as flow from a defined input chamber in a diffused flow path to an output chamber which is preferably arranged circumferentially around a filtration media which circumscribes the input chamber. For purposes of the present invention, a liquid to be filtered enters the filter media from the center of the media. The filtrate exits the filtration unit from around the filter media. The unique reverse flow process of the present invention can be implemented in conventional filtration systems by reversing the conventional output to an input and vice versa.

An adaptable commercial filter housing or a custom-made filter housing may be used with the filtration media of the present invention. If the filtration system conditions require elevated temperatures, high pressures or aggressive fluids, which are beyond the scope of food grade plastic materials, stronger plastics or exotic metals are recommended for use with the present invention.

A custom made chemical and particulate filtration system may be constructed such that the molecular absorption media unit and the submicronic media unit are both contained in a single filter housing. The molecular absorption media unit and the submicronic media unit can be arranged in series in the custom filter system. In a preferred embodiment, the filter housing is constructed of a clear plastic material for observation of the filtration process.

In some filtration applications, due to the nature of the solution to be filtered, pre-filtration with a 0.65 micron filter followed by several molecular absorption filter units in series and a 0.20 submicronic filter unit as the last stage, provides superior results. This sequence enhances the filtration process by combining chemical filtration with particulate filtration, simultaneously by using a 0.20 submicronic filter as the final stage filtration media.

The present invention also provides a high flow rate filtration method which removes organic and inorganic solutes and particulate from a liquid. The method is a sequential reverse flow filtration of a substance by contacting it, in a reverse flow manner, first with a molecular absorption filter media. After contact with the molecular absorption filter media the filtrate is then contacted, in a reverse flow manner, with a submicronic filter media. The unique sequential reverse flow method of the present invention results in the aggregation of particles smaller than 0.1 micron into particles of a filterable 0.1 micron size. This facilitates the removal of organic and inorganic solutes which are modified by the filtration process. The modification causes organic and inorganic solutes to aggregate into particles of a filterable size. The method of the present invention provides a filtrate with absolute particle micron ratings as low as 0.1.

Another unique feature of the sequential reverse flow filtration apparatus/method is a visible color change of the filter media when it is in contact with a liquid which is being filtered. The visible color changes can be used to indicate the removal of a particular contaminant or contaminants. Color changes in the molecular absorption media indicate absorption or adsorption of organic and inorganic solutes from the liquid. The color changes allow the user to distinguish between the absorption/adsorption of organic solutes versus inorganic solutes. For example, a blue color of the molecular absorption media indicates the removal of copper salts from the liquid. Other color changes indicate the removal of the following contaminants: green—copper ion; orange—iron; yellowish green—organic nitrogen; tan to brown—proteins; dark brown—tannins and humic acid; light tan—hexa-metaphosphate; yellow—tetra-ethyl-lead; grey—manganese; and black—urea, ammonia and organic nitrogen. The visible color change of the filter media can be extrapolated to correlate to the total concentration of organic and inorganic solutes retained in the molecular absorption media.

The submicronic filter media also visibly changes color when it is in contact with a liquid which is being filtered. Color changes of the submicron filter media can also be used to indicate the removal of a particular contaminant or contaminants. The color change of the submicronic filter media can be used to distinguish the filtration of simple particles in solution versus particles mixed with organic and inorganic solutes. The visible color change coupled with an increase in differential pressure, of less than or equal to 15 psi, can be extrapolated to indicate the removal of particulate and/or organic and inorganic solutes. For example, no color change of the submicronic filter media coupled with an increase in differential pressure indicates the removal of latex or acrylic beads from deionized water. Other color changes and/or increases in differential pressure indicate the removal of the following contaminants: tan to light brown—water soluble polymers in potable water; blue—copper particles mixed with cupric ions; black and an increase in differential pressure—urea, ammonia, organic nitrogen and bacteria; and orange—iron particles in ethylene glycol solution.

The molecular absorption filter media may be made of a material formed from a composition made of 48 to 62 weight percent water; 10 to 18 weight percent of an aqueous solution containing 70 weight percent of a polymer which is about 60–95 weight percent of at least one alkylacrylate or alkylmethacrylate and 5–40 weight percent acrylic acid; 14 to 22 weight percent of a forty percent by weight solids, prepolymer solution; 2.5 to 7.2 weight percent of a 3 percent by volume ammonia solution; and 3.5 to 7.2 weight percent of an epoxy resin, as previously described in U.S. Pat. No. 4,076,619, the disclosure of which is incorporated herein by reference. The molecular absorption filter media may be formed into pellets, compressed into discs or any other suitable filter format.

The submicron filter media may be made of a one-piece construction of a continuous matrix material having an initial micron rating of from about 1 to about 5 microns; a hydrophilic terpolymer impregnated on the matrix material by step-wise addition of a low-viscosity terpolymeric polymerization mixture made of from 10% to about 14% by weight of a polymer which includes at least one of alkylacrylate and alkylmethacrylate and acrylic acid; from about 17% to about 22% by weight polyethyleneimine and urea solution; from about 7% to about 10% by weight ammonia; and from about 2% to about 6% by weight epoxy resin, the polymerization mixture having a solids content of from about 15% to about 20% by weight prior to polymerization, as previously described in U.S. Pat. No. 4,620,932, the disclosure of which is incorporated herein by reference. The submicron filter media may be formed into a filter bag or any other suitable filter format.

Figure 2:
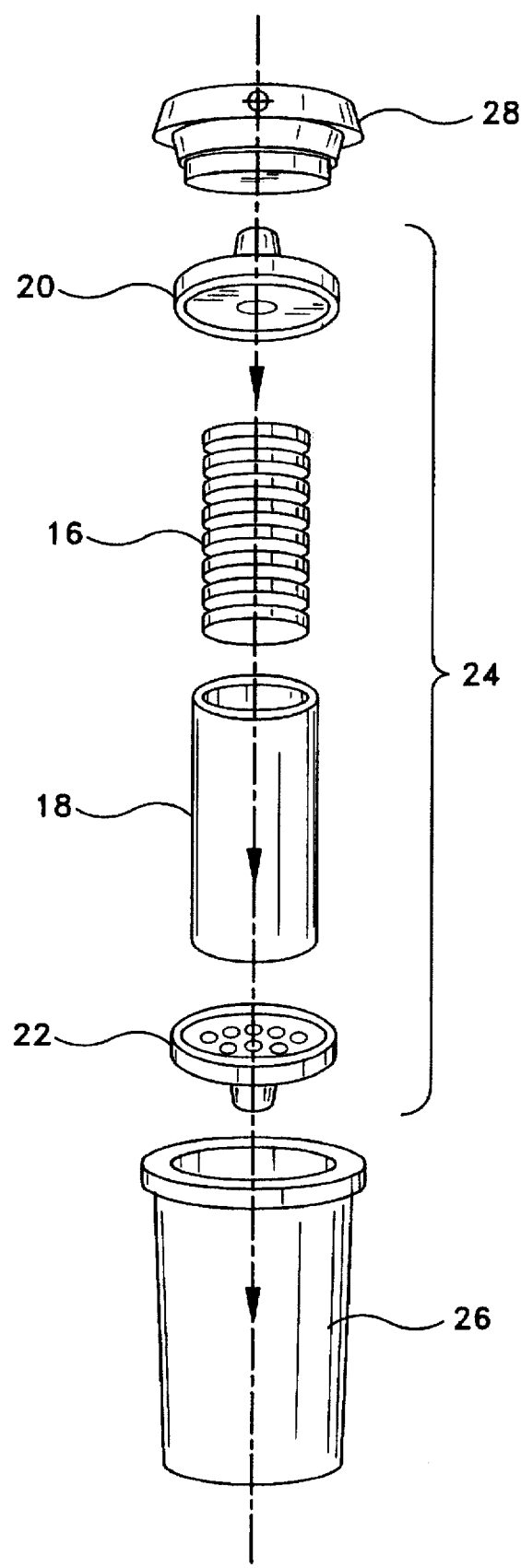
FIG. 2 is an exploded view of the molecular absorption filter unit component of the present invention.

The molecular absorption filter media is linear in absorbent function and does not desorb upon saturation. The (chemical) molecular absorption filter media is combined with the (particulate) submicronic filter media to synergistically provide an unique high flow rate liquid filtration system. For optimum liquid filtration and efficiency, the preferred form of the molecular absorption filter media, as shown in FIG. 2 is a column of disc filters 16 of any dimension, as required for molecular absorption of dissolved pollutants. The molecular absorption disc filters 16 are housed in a clear plastic molecular absorption disc retainer sleeve 18. The disc retainer sleeve 18 is fitted with a top end cap 20 and a bottom end cap 22. The end caps, 20 and 22, the disc retainer sleeve 18 and the molecular absorption disc filters 16 make up a molecular absorption assembly 24. The end caps effect a liquid tight seal at the top and bottom of the assembly 24. The molecular absorption assembly 24 is enclosed in a clear plastic canister housing 26 having a housing lid 28. The housing lid 28 contains an o-ring seal and is threaded into the canister housing 26 to effect a liquid tight seal on the molecular absorption assembly 24.

Figure 3:
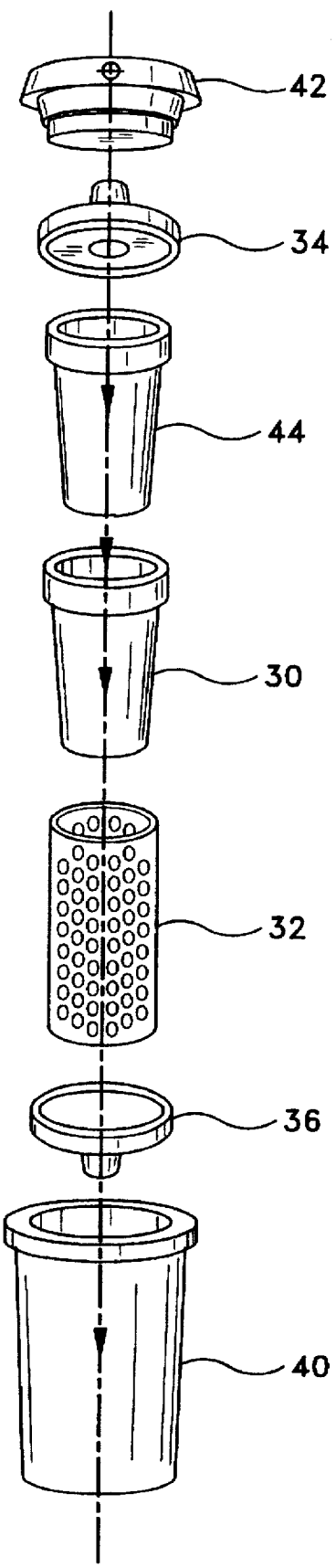
FIG. 3 is an exploded view of the submicronic filter unit component of the present invention.

The preferred form of submicronic filter media, as shown in FIG. 3, is a filter bag 30 for submicronic particulate filtration of the filtered liquid received from the molecular absorption filter media unit. The submicronic filter bag is housed in a clear plastic perforated bag retainer sleeve 32. The perforated bag retainer sleeve 32 is fitted with a top end cap 34 and a bottom end cap 36. The end caps 34 and 36, the bag retainer sleeve 32 and the submicronic filter bag 30 make up a submicronic filter assembly 38. The end caps 34 and 36 effect a liquid tight seal at the top and bottom, respectively, of the assembly 38 in much the same way as described above for the molecular absorption assembly. The submicronic filter assembly 38 is enclosed in a clear plastic canister housing 40 having a housing lid 42. The housing lid 42 contains an O-ring seal and is threaded into the canister housing 40 to effect a liquid tight seal on the submicronic filter assembly 38.

The submicronic filter bag 30 may be a 0.1 micron, 0.2 micron, 0.4 micron or a 0.65 micron filter bag. The submicron filter assembly 38 may optionally include a 1.0 micron sacrificial filter bag 44 which is situated inside the submicronic filter bag 30. The sacrificial filter bag 44 serves as a prefilter prior to liquid contacting the submicronic filter bag 30. A preferred method of filter bag fabrication is by welding of the seams. However, comparable results can be obtained with a sewn bag, in which the needle holes are sealed after construction.

The diameter and thickness of the molecular absorption filter media in disc form, as well as the quantity contained in the column, depends on the desired rate of flow, liquid viscosity and the amount and type of dissolved pollutants to be removed from the liquid. For example, a column of eighteen (18) 3¾" diameter discs each of 1" thickness showed unmatched absorption of dissolved and undissolved organic and inorganic materials from liquids (polar solvents) at flow rates of 40–50 gal./min. At 150 gal./min., the size and quantity of molecular absorption filter media in the column may be increased to 7" diameter discs in a column of 24 units. Replacement of the filter media of the invention is recommended after filtration of 1 million plus gallons of liquid. However, molecular absorption discs are changed as required, when chemical testing of the filtrate indicates the presence of contaminants.

Replacement of submicron filter bags, when used on potable water systems having a 60 PSI line pressure, is generally not required until an excess of 2,000,000 gallons of water has been filtered. The size of submicronic media filter bag depends on the liquid flow rate, viscosity and amount of particulate contained in the liquid filtrate received from the molecular absorption filter unit. For example, a 4" diameter×19" long submicronic filter bag installed in a 40–50 gallon/minute system continuously produces 0.20 micron absolute liquid purity filtrate. At 150 gallons/minute, to achieve a comparable micron liquid purity, the filter media bag must be increased in size to a 7" diameter×32" length.

While the molecular absorption filter media and the submicronic filter media of the present invention have been known for use separately, when liquids containing dissolved pollutants and particulate must be filtered, optimum filtration results are obtained by using the inventive combination of molecular absorption filter media followed by sequential filtration with the submicronic filter media in a reverse flow mode of operation. The sequential multistage filtration of the present invention allows organic and inorganic solutes to be removed from a liquid as particulate. The sequential reverse flow principle of the invention incorporates molecular absorption media and submicron filter media which provides 0.1 micron absolute rated filtrate at a flow rate of 20 to 150 gal./min. with negligible system pressure differential. In contrast, all presently known filter systems and products have flow rates of a few milliliters/minute at a substantial pressure differential.

Figure 4:
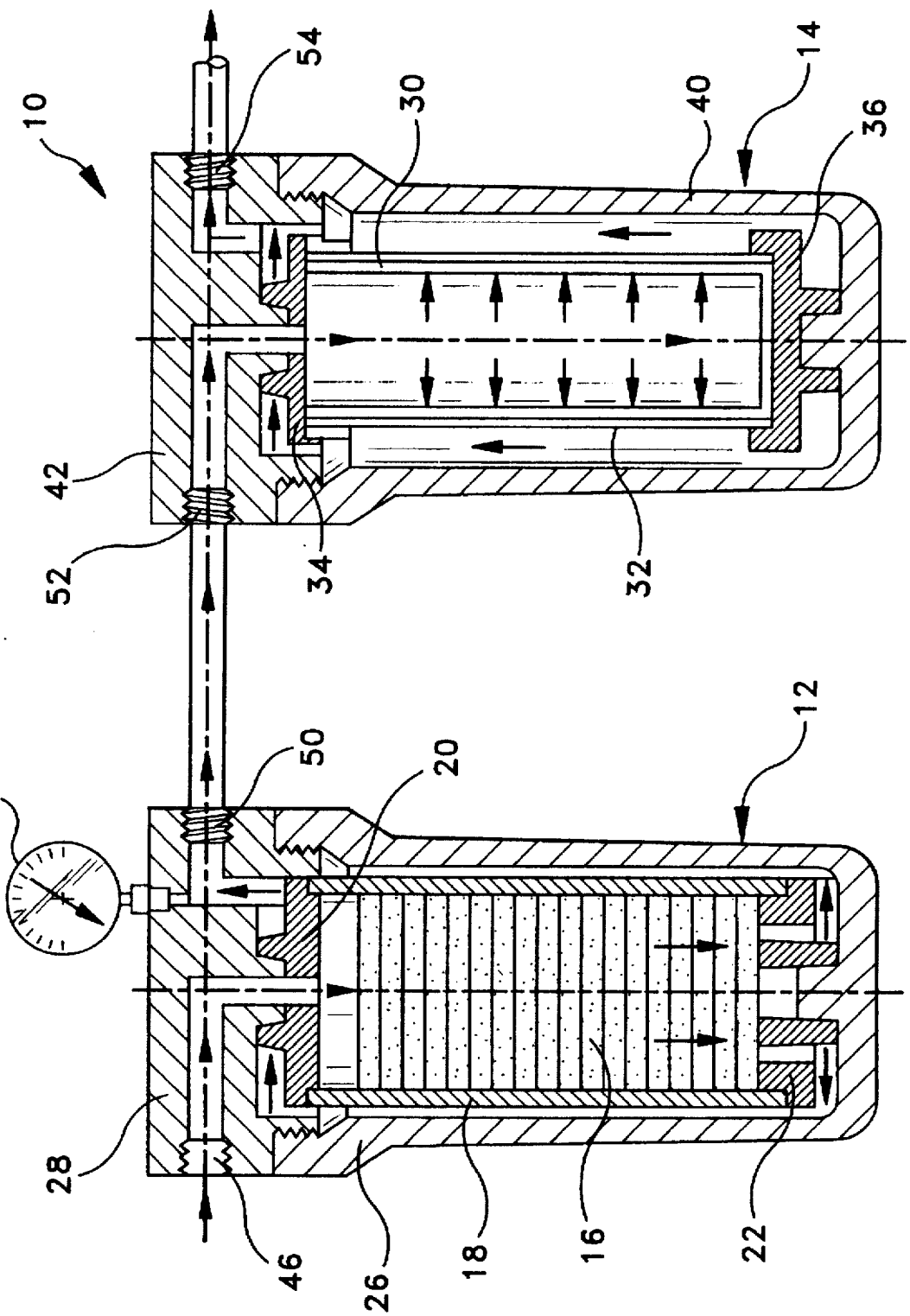
FIG. 4 is an elevational view in section of the filtration system of the present invention.

Turning now to FIG. 4, liquids, with a specific gravity maximum of 1.035, entering the molecular absorption filter unit 12 and subsequently passing through the submicronic filter unit 14 can be processed by means of gravity, use of a pump, or other means provided that at least one lb/in$^2$ liquid pressure or head is available to initiate flow. As filtration of the liquid progresses, the filter media in both units 12 and 14 load-up with the dissolved pollutants and particulate. This loading-up may require increased liquid pressure. However, the pressure required to perpetuate filtration increases insignificantly with the present invention in comparison with conventional state-of-the-art devices. For example, after filtering millions of gallons of water with the invention at 40–50 gallons per minute the invention developed a pressure differential increase of less than 15 psi.

As shown in FIG. 4, a liquid to be filtered is passed into a filter canister housing lid or cover 28, through a threaded or non-threaded inlet 46. In conventional filtration systems the inlet port 46 would be an outlet port since it is in fluid communication with the interior compartment of the filtration housing. Contrary to conventional systems, however, in the present invention liquid progresses downward from the center of the cover 28, through a clear plastic molecular absorption disc retainer sleeve 18, containing a column of molecular absorption discs 16, of a form previously described. The molecular absorption discs 16 are held in place within the retainer sleeve 18 by end caps 20 and 22, both of which maintain liquid tight seals at the top and bottom, respectively, of the filter housing. The liquid upon reaching the bottom of the column of filters enters a series of holes in the bottom end cap 20, and exits as a filtered liquid. The liquid is free of dissolved total organic contaminants (TOCs) less than 20 µg/l (ppb), volatile organic contaminants (VOCs) less than 5 µg/l and organic and inorganic pollutants while the total hardness remains the same. The filtrate traverses upward between the outside surface of the transparent molecular absorption disc retainer 18, and an inside wall or surface of a transparent housing 26. The filtered liquid progresses upward to the top of the housing 26, and into the lid or cover 28, and then out of the unit via exit port 50. A gauge 48, may be inserted in the lid 28 to provide a reading of the liquid differential pressure. To prevent leakage or bypass of liquid anywhere during the filtration process the housing lid 28, contains an o-ring seal and is threaded into the housing 26, forming a water-tight seal between the end caps 20 and 22 and the sleeve 18.

As shown in FIG. 4, a submicronic filtration unit 14 is connected for fluid flow with the molecular absorption unit 12 at location downstream. The effluent from unit 12 enters unit 14 via input port 52 and exits unit 14 via output port 54 in much the same way as described above for the molecular absorption unit 12. However, a submicronic filter media as described above, is utilized in bag form 30, and is inserted within a perforated bag retainer sleeve 32, contained within filter canister housing 40 which can be transparent. The submicronic filter media 30, can be in the form of a welded, fused or sewn polymeric material. Bag 30 is placed within the perforated sleeve 32, and is held in place by end caps 34 and 36. End caps 34 and 36 effect a liquid tight seal at the top and bottom, respectively, of the bag retainer sleeve 32 in much the same manner as described above for the molecular absorption unit. However, the bottom end cap 36, does not contain openings for fluid to exit the filter bag at the bottom. Unique to the operation of the invention is the retention of the submicronic filter media 30, in a preferred bag form, within a circumferentially and longitudinally perforated sleeve 32. The perforated sleeve 32 may be constructed of clear plastic, metal or other materials which are appropriate for the particular filtration application.

Unlike the molecular absorption filter described above, the submicronic filter provides 0.1 micron particulate free liquids. The incoming liquid is passed downward through the center of a canister housing lid 42, into the submicronic bag 30, and exits the filter media radially through the submicronic filter via the perforated holes of the sleeve 32, into a cavity between the perforated sleeve and an inner wall of the housing 40. The liquid being filtered traverses upward between the outside of retainer sleeve 32, and the inner wall of the housing 40, and exits out of the housing lid 42 through exit port 54. The filtrate is free of dissolved pollutants and particulate to 0.1 absolute particle micron rating.

The filtration system and method described above provides continuous and submicronic liquid purity. Liquid purity depends only upon reasonable attention to replacement of the filter media. However, the filter media in both the molecular absorption and submicronic units of the invention are substantially non-rechargeable except that metallic ions may be eluted from the media. State-of-the-art ion-exchange resins and other forms of filtration media are rechargeable. Rechargeability contributes to downstream contamination in conventional filtration systems. Accordingly, the risk of downstream contamination by the present invention during the filtration process is eliminated.

EXAMPLES

The following are examples of applications of the invention which provide submicronic filtrate heretofore unattainable by any known filtration media, equipment, and/or systems. Each of the customized applications of the invention was made with the intent of solving a specific and technically difficult problem irrespective of the economics of the particular application. The examples illustrate the unique flexibility of the invention in filtering liquids in a reverse flow manner, by single pass exposure to the filtration media at flow rates ranging from 2,400 to 12,000 gallons per hour at negligible pressure differential with millions of gallons of filtrate being produced.

The following examples serve to provide further appreciation of the invention but are not meant in any way to restrict the effective scope of the invention.

Example 1

Cold Sterilization Combined with Chemical Filtration

Numerous companies need very clean liquids which are either incorporated into a finished product or are necessary for various stages during the processing of their products. These liquids can be potable water, process water, saline solutions, rinse water, chemical solutions or any other liquid used in the processing and manufacturing of products. Very clean liquids are also required to meet fluid discharge compliance standards of the EPA and State Department Agencies.

Pilot test units were supplied to various companies, which had previously tried both submicron filtration and chemical filtration conventional devices with very limited positive results. Conventional filtration devices failed due to very high particulate loading and their inability to filter colloidal suspensions, solutions containing high protein levels, solutions containing high concentrations of metallic ions and phased solutions. These problems are common in industrial applications using conventional filtration systems. Conventional devices are also undesirable due to slow flow-rates, the necessity of excessive prefiltration and the necessity of multi-stage chemical filtration. Many manufacturing companies are looking to produce better quality products, more cost effectively, without complicated multi-stage filtration.

The molecular absorption filter media (chemical) and submicronic filter media (particulate) liquid filtration system was designed with various modifications to custom-suit specific applications required in various manufacturing facilities. The following are examples of several customized applications of the present invention:

1) A filtration system designed with a 1.0 micron pre-filter and a 0.65 submicronic filter unit, two molecular absorption filter media units and a 0.20 submicronic filter unit arranged in series. This filtration system is designed to filter liquids having a high suspended solids content of 2,500 mg/l (ppm)

or greater. The liquids may contain polyphosphates and TOCs greater than 5000 mg/l (ppm), heavy metals of 20 mg/l (ppm) and VOCs of 500 mg/l (ppm).

2) Three molecular absorption units, one 0.45 submicronic filter unit and one 0.20 submicronic filter unit arranged in series. These filters are capable of filtering heavy metals above 10 mg/l (ppm) and VOCs above 500 µg/l (ppb).

3) One 0.65 submicronic filter unit, one 0.20 submicronic filter and one or two molecular absorption units arranged in series. Rinse water containing less than 2 mg/l of heavy metals has a total suspended solids below 1000 mg/l, VOCs below 100 µg/l (ppb) and TOCs below 1000 mg/l (ppm).

The present invention provided many benefits over conventional filtration systems, including the production of a higher quality filtrate, higher flow rates during filtration and longer life of the filter media.

These systems are designed to function under high particle loading conditions. The prefilters are one micron and 0.65 micron size. These prefilters remove colloidal suspensions, metallic particles, yeast, molds, process sediments and subsequently pass the filtrate to the chemical filters. The chemical filter sorb: tannins, humic acids, VOCs, TOCs, metallic ions, phosphates, proteins, lipoproteins and mid and high molecular weight organics. The filtrate is next passed to the 0.20 submicron filter for final stage filtration. Some solutes that are not retained in the chemical filter are sufficiently effected as to surface tension and chemistry changes by the previous four stages such that they form a type of particle retained by the 0.20 micron filter.

Under high particle loading conditions the filter system is normally supplied fluid at 25–40 GPM maximum flow rate. These systems are capable of taking potable water, river water or ocean water and producing a high quality filtrate containing less than 0.01 mg/l—heavy metals, less than 0.03 mg/l—TOC level—subtracting bicarbonates, carbonates and $CO_2$ levels. The filtrate has a total phosphorous content below 400 µg/l. VOCs, pesticides and insecticides are less than 50 µg/l after the first pass through the system.

Example 2

Metals Removal

The present invention is unique, in form or method of filtration, in that it is able to remove rare and exotic metals from water and other solutions. For example, at a mine site in Colorado, U.S.A. dissolved gold in low milligram/liter (mg/l) concentrations could not be removed from cold water leachable tailing run-off by conventional filtration techniques. The conventional filtration techniques failed for several reasons. For example, ion-exchange resins could not function as a filtration media at water temperatures below 45° F. Reverse osmosis and ion-exchange resins experienced fouling of the filter media/system due to multiple mixtures of dissolved metallic ions at concentrations in excess of 50–2000 mg/l. Conventional micron and submicron filter systems fouled due to overload and blinding from high concentrations of total suspended solids in the form of particulate size metals and minerals. Conventional filtration systems utilizing organic solvents, acid pH materials or precipitation sludge were unacceptable for use in the highly sensitive mountain environment. In addition, environmental controls prevented the use of other conventional filtration techniques.

The present invention tested on-site was a combination of two 50 GPM submicronic canisters rated at (0.65 and 0.20 micron) and two 50 GPM molecular absorption canisters. The pH of the water passing through the last stage filters was increased to 8.30. Filtration with the present invention resulted in the removal of gold fines from the solution at 1 µg/l (ppb) atomic absorption detection limits without damage to or a reduction in efficiency of the filter media or system. (Atomic absorption detection limits-Graphite Furnace-Atomic Absorption Spectrophotometry ASTM Standard D 3913-85.) The invention accomplished the above in an environmentally safe manner, was totally free of hazardous materials, and did not result in water temperature changes or downstream pollution. The pH of the filtrate was adjusted to 7.00 before returning the filtered water to river.

Further, the last stage molecular absorption media of the invention turned gold in color. Upon saturation of the filter medium, after passage of 2 million plus gallons of filtrate, the gold metal was eluted from the invention using a 37 percent hydrochloric acid solution in a subsequent process. In addition, two molecular absorption units of the present invention, when used in series, acted as chemical pre-filters and removed dissolved iron, chromium, copper and silver from the mine run-off water.

This 5 stage system is designed to function under conditions where dissolved metallic ions exceed 10 mg/l, phosphates exceed 5 mg/l, TOCs exceed 5,000 µg/l and VOCs, insecticides and pesticides exceed 500 µg/l.

Flow rates vary from 30–50 GPM depending on which substances are to be filtered. The system was on line for 1,000,000 gallons total volume. If a very low level VOC is filtered (under 10 µg/l) or very low level metals (lead 10 µg/l) one or more of the chemical media should be changed more frequently. If 1,2-dibromoethane (action level 0.1 µg/l), methylene chloride (action level 25 µg/l), PCB's (action level 1.0 µg/l), tetrachloroethylene (action level 20 µg/l), trichloroethylene (5.0 µg/l), vinyl chloride (action level 2.0 µg/l), or other similar low action level compounds are encountered, system flow rates should be adjusted downward to approximately 20–30 GPM or the total gallon throughput reduced.

If higher flow rates are required (35–50 GPM) the 0.45 µm canister is removed and an additional molecular absorption unit can be substituted.

Example 3

Hydroponic Farming

Several leading domestic companies engaged in R&D for Hydroponic Farming, as well as NASA's Ames Research Center, needed to improve the quality of feed water for their liquid nutrient solutions. The invention was tested using two molecular absorption units and one 0.20 submicronic unit for raw feed water filtration, followed by one 0.45 submicronic unit and one molecular absorption unit in front of a conventional RO system. The conventional RO system was followed by one 0.20 submicronic unit of the invention.

Feed water for nutrient solutions is a mixture of very low hardness water (0.1–1.0 mg/l) and water containing 150 mg/l hardness. The above configuration of the invention removed metallic ions, VOCs, TOCs, and organic and inorganic phosphates from the feed water. Chlorine was removed by coconut activated carbon prior to filtration by the invention. Prefiltration with coconut activated carbon facilitated the removal, by the present invention, of the impurities, fines and phosphates released by the carbon. The invention provided a high quality water for RO systems and mix water for feed water. The higher quality water produced by the invention allowed better control over nutrient solutions and better quality, size and yield of farm produce.

The stage 4 system is designed for general usage at flow rates of 30–50 GPM. The design assumes moderate particle loads and moderate chemical solute loads. It can be used on potable water systems, prefilters for R.O. systems, prefilter for D.I. systems. The system can be used on waste water discharge systems—provided that high levels of metallic ions above 5 mg/l, TOCs above 3,500 µg/l and VOCs, insecticides and pesticides above 200 µg/l are not encountered.

This system was in place for over twelve months and produced water having a metallic ions (chelated or non-chelated) content of 0.04 mg/l, VOCs content of 0.009 mg/l, TOCs content (less: subtraction for bicarbonation, carbonation and $CO_2$ which give false positives of organic carbon) of 0.015 mg/l.

Example 4

Drinking Water

In a number of Southern New Jersey and Southern Pennsylvania communities national media publications have publicized human health problems emanating from contaminated well water supplies. Well water contamination results from toxic land fill leachate, farm-runoff contaminating aquifers, and illegal toxic dumping. Presently, EPA regulations require well testing on a yearly basis. However, if a homeowner wishes to sell property serviced by a well, the well water must satisfy EPA regulations. Consequently, a group of property owners having wells with varying concentrations of pollutants were available as test sites.

One or two molecular absorption canisters of the present invention were used in series followed by a 0.20 submicronic filter canister, depending on the complexity of the filtration problem. This configuration of the invention removed pesticides, phosphates (organic and inorganic), volatile organics, metals (iron, copper, chromium, zinc, lead), nitrates (produced by nitrification) and bacteria. The results obtained and purity levels are listed in Table 1. The invention was installed on the in-coming water line of the homeowner's water system at flow rates up to 20 GPM. This system utilizes a 10" filter bag having a 3" diameter and 12 discs of 3" diameter. The system was placed in homes for over 24 months. The average daily household water consumption was 50–150 gallons per day. During the summer months the average daily household water consumption in some households increased to approximately 300 gallons per day. The media was changed approximately every 60 days. The limiting factor for water flow was the maximum pressure of each homeowner's well pump.

TABLE 1

Removal Of Contaminants From Drinking Water

| Contaminant Removed | Purity Level* | Monitoring/Detection Method |
| --- | --- | --- |
| Pesticides (organohalide, organochlorine, organophosphate) | <1.0 µg/l | Microextraction and Gas Chromoatography with electron capture detector. |
| Phosphates (total phosphorus) | <0.01 mg/l | Acid digestion/colorimetric ascorbic acid reduction. (ASTM** method D515-Section 14.3) |
| Volatile Organic Compounds (VOCs) | <10 µg/l | Purgeable organic compounds in water using headspace sampling for Gas Chromatography with electron capture detector. |
| Heavy metals | <10 µg/l | Chelation-Extraction and Atomic Absorption Spectrophotometry with Graphite Furnace. (ASTM Standard D-3913-85) |
| Nitrites/Nitrates | <0.05– 1.0 mg/l nitrogen | Cadmium Reduction-colorimetric. (ASTM Standard D-3867-90) |
| Bacteria | <1 colony/ liter | Bacterial Retentive Membrane Filter. (ASTM Standard D488-79) |

*Level of contaminant remaining after filtration process.
**ASTM (American Society for Testing and Materials)

During the course of these experiments, it was determined after further testing that if the nitrate levels in the water were not lowered by the invention, the nitrate was in the form of sodium nitrate or potassium nitrate. The sodium/potassium nitrate was filtered out of the water by the removal of six discs from each of the molecular absorption canisters. After removal of the six molecular absorption discs from the invention, coconut shell activated-carbon and ion-exchange resin filter media were stacked in the invention. This combination of molecular absorption filter media, activated-carbon, and ion-exchange resin not only filtered sodium/potassium nitrate from the water, but was capable of removing chlorine, hydrogen sulfide, $CO_2$ and nitrite as well. This was accomplished at flow rates not achievable by conventional systems and methods.

If the well water contained very low levels of lead or chromium, the molecular absorption media's performance was enhanced by a prewash with a 37% HCl solution. The prewash removed various trace products normally used to stabilize the filter media but which interfere with the removal of very low levels of lead and chromium, i.e., 3–5 µg/l (ppb).

Example 5

Compliance with EPA Industrial Effluent Standards

A number of industrial locations in Northeastern USA, practicing a variety of industrial processes, were encountering serious problems complying with new EPA effluent water standards. For example, the manufacturing processes affected were metal plating, glass manufacture, computer chip manufacture, synthetic fiber production, and a myriad of other manufacturing processes. Each company was disposing of large volumes of liquid effluent into sewers, ponds, lakes, rivers, the Atlantic Ocean, and open land areas. The costs of meeting the revised EPA standards using known equipment were prohibitive. Some States, due to the more stringent EPA water effluent parts per million standards, had forced many manufacturing companies to relocate or shut down their operations in the U.S.A.

In tests conducted by engineers at the various test facilities, installation of the invention at effluent discharge points, not only met EPA standards listed in Table 2, but produced an industrial effluent quality better than the most stringent state regulations. In addition, the replacement cost estimate of the filter media of the present invention was acceptable to the management of the test companies.

TABLE 2

EPA Standards And Acceptable Effluent Limits

| Substance | Comments and Limits |
|---|---|
| Aluminum | National Pollution Discharge Elimination System - Some permits limit discharge level to 5 mg/l. Drinking water standard 0.05 mg/l (American Water Works Association). |
| Magnesium | EPA - National primary drinking water regulations - 50 µg/l detected by Atomic Absorption - Graphite Furnace. |
| Cobalt | occurs in river water from coal gasification plants. EPA - Maximum limit 8 mg/l in river water. |
| Chromium | Hexavalent and Trivalent - from industrial plants, dyes and explosives manufacturing facilities, textile dying and stainless steel pickling plants rinse water. Acceptable level 0.05 mg/l maximum in river water. |
| Copper | Added to river water and residential water at approximate .20 mg/l for the biological control of algae. |
| Cadmium | Maximum .20 µg/l in refinery effluent and plating rinse water. |
| Zinc | Maximum 7.0 mg/l, above 5.0 mg/l in alkaline water can cause bitter taste and opalescence. |
| Arsenic | Herbicide, insecticide, and many industrial effluents contain arsenic organically bonded (phenylarsonic acid). Waste water maximum 200 µg/l. |
| Lead | Drinking water maximum 15 µg/l. Maximum for waste water 10 mg\l (product plant process water). |
| Mercury | Inorganic and methyl mercury, less than 100 µg/l. |
| Molybdenum | NPDES - Permit for discharge waste water 25 µg/l. Waste product of chemical cleaners and molybdenum alloy production. |
| Accylonitrile | 35 µg/l |
| Benzene | 1 µg/l–5.0 µgffl |
| Carbon tetrachloride | 5 mg/l |
| 1,2-Dibromoethane | (EDB 0.1 µg/l) |
| Para-dichlorobenzene | 75 µg/l |
| 1,2-Dichloroethane | 1 µg/l |
| 1,1-Dichloroethylene | 7 µg/l |
| Ethylene Glycol | 100 µg/l |
| Isopropyl Alcohol | 1,000 µg/l |
| Methyl-Tert-Butyl Ether | 100 µg/l |
| Polychlorinated Biphenyls | 1 µg/l |
| Toluene | 1,000 µg/l |
| 1,1,1,-Trichloroethane | 200 µg/l |
| Trichloroethylene | 5 µg/l |
| Vinyl Chloride | 2 µg/l |

Example 6

Enhancing Reverse Osmosis System Performance

Testing of the invention located in series with, and in front of, RO membranes stripped the filtrate of dissolved organics, metals, and other contaminants. Only dissolved minerals (hardness) remained for removal with the RO membranes. Reverse osmosis membrane output increased by 40–60 percent when the invention was used in concert with them.

Normally 300 molecular weight membranes reject or waste 70–90% of intake fluid to the sewer. When using the invention as a pre-filter, the fluid exiting to the sewer is reduced by 50% this results in rejection or waste of only 20–40% as compared to 70–90% rejection described above. In addition, the energy requirements for operating a RO system are dramatically reduced. The invention, when installed in a filtration system as a pre-filter for RO membranes substantially reduces the cost of operation and lowers the water requirements of RO membrane filtration.

In particular, a 0.65 micron filter system, a two molecular absorption filters and a 0.20 micron filter were placed in series on a tap water feed source from a reservoir or artesian well. This system eliminates all pre-filters from the R.O. System. It is connected directly to the booster pump leading to the R.O. membranes. It produces water at a flow rate of 40–50 GPM of the following quality: metallic ions (chelated and non-chelated) of 70 µg/l–3 µg/l, VOCs of 100 µg/l–3 µg/l, TOCs (less: Carbonates, Bicarbonates and $CO_2$–> which produce a false positive for organic carbon) of 0.900–0.050 mg/l, phosphate (inorganic and organic) of 0.090–0.040 mg/l—including water soluble polyphosphate base polymers. Media life span total based on throughput of 72,000 gallons per day is 20–30 days minimum for submicron filters and 10–20 day minimum for molecular absorption filters.

This system will reduce membrane discharge waste water depending on the membrane's molecular weight cutoff range by 40%–70%. The R.O. water produced above is used as feed water for D.I. resins where high quality ultra pure water (10–18 meg/ohm) is the necessary end product, for example in R&D labs producing medical products and regents.

The R.O. membranes can remain on line for over 16 months without requiring any service except for changing the carbon pre-filter and acid flushing the wash water discharge lines to remove scale formation. Further, electric requirements to run the booster pump are reduced by 40%–70%.

High quality RO systems utilize molecular weight cut-off membrane ranging from 1000 to 300 Daltons. In contrast to the invention, these RO systems require carbon filtration, prefiltration of particulate and high pressure booster pumps to function. Often, this additional cost of prefiltration is economically unfeasible for the user.

In a further example, a river water feed source having a total suspended solids level of approximately 1,200 mg/l–3, 200 mg/l was filtered with a 5 micron pre-filter, a 1 micron pre-filter, a 0.65 µm filter, three molecular absorption filters and a 0.20 µm filter which were placed in series on the river water feed source.

This system handles raw river water at a constant flow rate of 40 GPM. It requires no additional filtration and is connected directly to the booster pump in the R.O. System. Based on 57,600 gallons per day the pre-filters are changed every 3–5 days, the submicron (0.65) filters are changed every 5–10 days the molecular absorption filters are changed every 9–15 days and the submicron 0.20 filter is changed every 10–17 days. If daily flow requirements are under 57,600 gallons, the daily media life expectancy will by slightly higher. The quality of filtrate produced to the last day of usage is listed in Table 3.

TABLE 3

| FILTRATE QUALITY | |
| --- | --- |
| Metallic Ions (chelated and non-chelated) | 100 µg/l–9 µg/l |
| VOCs | 250 µg/l–9 µg/l |
| TOCs* | 200 µg/l–90 µg/l |
| Phosphates | 100 µg/l |
| Total suspended solids | 100 µg/l |

*Less: Inorganic carbon sources - carbonates, bicarbonates and $CO_2$ (which produce a false positive for organic carbon).

Example 7

Increased Aqua Culture Production

The invention was installed and tested in large aqua culture systems at a number of facilities operated by private companies in the U.S.A. In addition, the invention was tested at facilities operated by domestic companies and foreign governments at various overseas locations. In particular, a five micron pre-filter followed by a one micron pre-filter is used if suspended solids exceeded 1,200 mg/l, followed by a 0.65 micron filter, 2 molecular absorption filters, and a 0.20 micron filter were arranged in series to filter source water from rivers, lakes and wells. This system will handle raw river or lake water at a constant flow of 50 GPM. Prior to installation of the invention, the quality of available water was poor. The poor water quality affected fish and invertebrate breeding, viability and variety. Numerous types of conventional filtration systems had been tested with no improvement in the water quality or in the loss of fish and invertebrates. Upon introduction of the invention into the system, water quality improved instantly. These results are listed in Table 4. Fish and invertebrate breeding and variety increased rapidly within a short period of time. Further, fish and invertebrate losses during the breeding and growth stages of development were improved by more than 1000 percent. This improvement was seen irrespective of the species, method of collection, and size of containment vessels prior to shipment for resale in the U.S.A. and other points of distribution.

TABLE 4

| WATER QUALITY | | |
| --- | --- | --- |
| Level of Contaminant Prior to Filtration | Contaminant | Level of Contaminant After Filtration |
| 0.10 mg/l–10 mg/l | Metallic ions (chelated and non-chelated) | 0.009 mg/l–0.01 mg/l |
| 0.095 mg/l–1.0 mg/l | VOCs | 0.006 mg/l–0.010 mg/l |
| 2,500 mg/l–5,000 mg/l | TOCs* | 0.05 mg/l–300 mg/l |
| 2–10 mg/l | Phosphate | 0.04 mg/l–0.09 mg/l |
| 1,100 mg/l–2,500 mg/l | Total Suspended Solids | 0.01 mg/l–0.05 mg/l |

*Less inorganic carbon, i.e., carbonates, bicarbonates and $CO_2$.

Example 8

Removal of Dissolved Organics From Potable Water Systems

As previously mentioned, dissolved organic contaminants are undesirable in potable water. They also interfere with various manufacturing processes and quality control procedures which require water having few dissolved organics and particulate. Traditional filtration technology have been unable to remove dissolved organics from potable water. In addition, traditional filtration methods are costly and time consuming.

In contrast, the invention produced a filtrate that far surpassed federal and state EPA potable water standards. The invention was tested as a four-stage filtration system on a Northern New Jersey reservoir water supply used by a manufacturing company. The first stage included a 1 micron pre-filter and a 0.65 submicronic filter unit. The second stage included two molecular absorption units, each containing a column of twenty 4" diameter molecular absorption discs. The third stage was a single 0.45 submicronic filter unit in series with a 0.20 submicronic filter unit. The final stage included two molecular absorption units, each containing a column of twelve 4" diameter filter discs, in series with one 0.20 submicronic filter unit. Ion-exchange resins may be added to the above four-stage system, after the third stage, if low hardness water is desired for a particular application.

The reservoir water was supplied to the invention at 50 GPM, with a pH of 6.8–7.0 and a hardness of 150 mg/l. Filtrate from the invention showed no change in either pH or hardness. The invention's filtrate contained VOCs, TOCs and heavy metals only in the lowest detectable (gas chromatography) atomic absorption parts per billion range. In addition, the filtrate produced by the invention was sterile and optically clear. These characteristics of the filtrate also surpassed all federal and state specifications for potable water. For example, heavy metals remained below 5.0 µg/l (ppb), total suspended solids remained below 120 mg/l (ppm), VOCs remained below 5 µg/l (ppb), TOCs remained below 500 µg/l (ppb) and polyphosphate, hexametaphosphate, orthophosphate and total phosphorus remained below 400 µg/l (ppb).

Combinations of state-of-the-art filter systems were unable to provide filtrate in excess of 1,000 gallons per day that could meet federal and state specifications for potable water. The conventional filtration media produce less than 1000 gallons a day at a prohibitive operating cost of 2400–3000 dollars per day for membrane replacement. In contrast, the invention produced 3000 gallons/hr. or 72,000 gallons/day of sterile, organic free and metal ion free filtered water, irrespective of the quality of the feed water.

Example 9

Removal of Aluminum in a Potable Water System

Aluminum is used in water treatment to flocculate heavy metals and organics. Under certain conditions or water pre-treatment procedures, aluminum is a by-product of alum flocculation. These aluminum compounds which are often found in water throughout the U.S.A. are lethal to fish and other forms of aquatic life. The largest tropical fish store in Oklahoma City, Okla., was using a filtration form of the inventor's U.S. Pat. No. 4,076,619. The filtration system was used for filtering make-up water. In addition, it was used as an in-tank sorbent for removing inorganic and organic impurities in the water. During a weekly water change, the filter turned red in color. The fish in the tanks showed signs of restricted respiration and quickly expired. Biologists at the local zoo suspected heavy metals in the aquarium water system. Further research eluted a toxic by-product of the water treatment process identified as a compound of aluminum. Submicron filtration with a minimum micron size of 0.45 µm is required under ASTM Standard (D857-89) Section 6.

The fish store's in-coming water supply was connected to 0.20 micron rated submicronic filter. All particulate metals from the in-coming water were removed instantly. The American Water Works Association has established a water quality guideline or goal of a maximum of 0.05 mg/l aluminum. A molecular absorption filter was connected in series with the particulate (submicronic) filter. This configuration removed both solute and particulate forms of metallic aluminum compounds from the water causing all fish mortalities to cease.

Conventional filter media and systems were unsuccessful for filtering trace levels of aluminum compounds from water used in aquariums. However, by installing one 0.20 micron filter in series with two molecular absorption filters before water usage in the store's fish tanks, all aluminum impurities were removed from the filtrate. Both solute aluminum compounds are removed to levels as low as 5 µg/l and aluminum particulates are removed to a level below 0.2 micron absolute purity. Water samples were tested under standard test methods for aluminum in water (ASTM D857-89). The molecular absorption filtration media located in specimen tanks remained free of any trace levels of aluminum. Filters have remained on line for over 14 months, requiring a filter change at approximately 6 months.

Example 10

Purgeable Volatile Organic Compounds in Water Supply

A fish and invertebrates (wet goods) distributor located in Knoxville, Tenn., had been using in its holding tanks the chemical filtration media covered by inventor's U.S. Pat. No. 4,076,619. The distributor experienced a sudden increase in fish mortalities during summer months. The fish fatalities were caused by a combination of volatile organic compounds (VOCs) and purgeable organic compounds (POCs), including 1,2,3,-trichloropropane, chlorobenzene, chloroform, bromochloroform, ethylbenzene, methylisobutyl ketone, 1,3,5,-triethylbenzene, acetone, P-chloro-o-toluidine ethylbenzene, methylaniline, P-toluidine. Water analysis showed a pH ranging from 6.0 to 7.7 and hardness ranging from 20–100 mg/l. Marine water, which contains lower levels of dissolved oxygen, experienced greater fish losses. In the salt water systems containing invertebrates, the POCs and VOCs caused discoloration and a substantial reduction in the size of the coelenterate population. Further study showed that maximum fatalities of the fishes occurred within 24 hours of making water changes during the summer months. None of the POCs (tri-halomethanes) or VOCs were found higher than 50.0 part-per billion level. Specimen deterioration occurred through a combination of POCs and VOCs and higher water temperature (lower dissolved oxygen levels).

The chemical filtration media (U.S. Pat. No. 4,076,619) was incorporated in a 500 gallon closed loop tap water system. Within 12 hours, the filter media turned reddish brown in color. In addition, the filtered solute was non-elutable from the filter media using a 20% hydrochloric acid solution. Water samples were tested for VOCs. The samples were found to contain a mix of various VOCs, which are normally found in industrial waste water.

A holding system containing chemical filtration media was impractical due to the large daily demand for potable water at the distributor's facility. The invention in the form of a 50 gal./min. filtration system having one 0.2 micron submicronic canister plus three molecular absorption canisters were connected in series and installed at the distribution facility. The filter media of the invention was changed every three (3) months or at a water flow consumption of approximately 2 million gallons. Upon periodic testing during the cycle, the water produced by the invention was nearly free of VOCs and POC, 1–5 µg/l (parts per billion range). POCs were tested for using dynamic headspace sampling prior to gas chromatographic analysis. ASTM D3871-84 V.O.C. test using microextraction and gas chromatography with electron capture detection and gas chromatography and electron impact mass spectrometry. ASTM D4128-89. This result is unattainable at economically feasible costs by other conventional filtration media and systems.

Example 11

Removing Tert-Butyl-Methyl Ether (MTBE), Zinc and Trihalomethanes from Potable Water In Thomaston, Conn. a local water supply (3 artisan wells feeding a central treatment and pumping station) was found to contain a mixture MTBE, zinc and trihalomethanes. The contamination affected the water supply in a number of local businesses. Each establishment observed a continuous deterioration of their water quality. In particular, a retail aquarium store suddenly noted mortality rates of 60%–70% after a 50% water change. Water samples were taken from most of the facilities and analyzed at a state certified laboratory. The water samples were found to contain the above-mentioned contaminants within acceptable Federal and State guidelines.

MTBE—Level detected 3.3 µg/l (ppb) [Action Level 100 µg/l (ppb)]

Zinc—Level detected 0.12 mg/l (ppb) [Action Level over 7.0 mg/l]

Bromodichloromethane Level detected 1.1 µg/l (ppb) [Action Level over 100 µg/l (ppb)]

chlorodibromethane—Level detected 2.0 µg/l (ppb) [Action Level over 100 µg/l (ppb)]

The State of Connecticut claimed that the 3.3 µg/l (ppb) level of MTBE was far below the Connecticut Action Level of 100 µg/l for volatile organic compounds. The drinking water met Connecticut Public Health code [Section 19-13-B102(I)] based upon human consumption criteria. The Tropical Fish store owner supplied fishes to a number of companies for usage in waste water discharge Aquatic Bioassay systems. The Companies were required to show fishes living a minimum of 48 hours in discharge water. However, no such standard existed for drinking water. Conventional filter systems proved unacceptable and experienced many difficulties. For example, conventional systems failed to remove the contaminants which are toxic to aquatic life. The toxic contaminants either by-passed the conventional filter media or desorbed from the filter back into the filtrate. Carbon filtration leached phosphates and desorbed MTBE, dichlorobromoethane, chlorodibromethane and did not remove zinc. In addition, conventional filtration methods were unacceptable and replacement media was costly. Ion Exchange resins are required to remove zinc. A sodium exchange resin could not be used, as the release of sodium ions into the filtrate would cause mortality in some species of fresh water fishes. The low levels of MTBE and trihalomethanes required a very high grade of coconut activated carbon and desorbtion occurred after only 100 gallons. The solution to the problem appeared to be filtration of the water supply at the end users facility with a configuration of the present invention.

The invention was installed at the Tropical Fish Store and included three molecular absorption units in series. The system was rated at 20 gal./min. with a maximum system pressure of 125 PSI. The invention, as described above, operated continuously for 45 days without need for filtration media replacement. Water samples were taken and analyzed periodically by certified water testing laboratories during this time period. Volatile organic compounds (MTBE, dichloromethane, chlorodibromethane) were detected by liquid/liquid extraction, purge-and-trap device, gas chromatography and electron impact mass spectrometry (ASTM D4128-89). Zinc was detected by Atomic Absorption, Chelation-Extraction (ASTM D1691-90).

The invention continuously produced filtrate free of contamination to levels below 20 ng/µl for VOCs and 2 µg/l (ppb) for zinc. This contaminant-free filtrate far exceeds federal and state specifications. The invention has been in test for 24 months with no diminution of satisfactory results. The Tropical Fish Store sold bottled water for 12 months to their customers and concerned Thomaston, Conn. residents. In 1992 the water supply was changed to a new service. Local newspapers ran articles about the EPA finding levels of MTBE over the 100 ppb Action Levels.

Example 12

Removal of Polyphosphate Complexes and Water Soluble Polymers from Potable Water As previously mentioned, removal of polyphosphates and water soluble polymers from potable water prior to drinking is problematic. The invention was installed and tested on the incoming municipal water supply, containing water treated with polyphosphates and water soluble polymers, at locations in Dallas, Tex.; Atlanta, Ga.; Orange, N.J.; and Hayward, Calif.

Through on-going R&D, a six-stage series filtration system was devised using the invention. The first and second stage included particulate filtration (0.65 submicron and 0.45 submicron) followed in series by three molecular absorption filtration units each containing 18, 4 inch diameter discs (3rd, 4th and 5th stages) all feeding into the final stage of one 0.20 submicron filter unit. The invention, in the above configuration, filtered 40–50 gal./min. of the potable water containing the additive polyphosphate and water soluble polymers. The invention was capable of filtering out dissolved organics (ppb range), heavy metals, phosphates and water soluble polymers on a continuous basis at 40–50 gal./min. for up to 1 million gallons of filtrate. The invention performed without blinding or by-passing any of the below contaminants: heavy metals; aluminum, manganese, iron, zinc, chromium, copper, nickel, arsenic, mercury, lead, molybdenum, cadmium, selenium and silver remained below 50 µg/l (ppb) for over 1,000,000 gallons filtered. Polyphosphate, orthophosphate and total phosphorus remained below 400 µg/l (ppb) for over 1,000,000 gallons filtered.

Example 13

Filtration of Acid—Lead Battery Wash Stations

The present invention was tested in battery wash stations. It was desired to remove contaminants, including lead (3–5 mg/l, oil, suspended solids (0.1%–0.5%) and dissolved solids (3%–5%) occurring in a low pH (1–3) contaminated rinse tank. These tanks rinsed 8–20 large acid/lead industrial batteries each weighing approximately 1,500–2,000 pounds per day. After several weeks of operation, the existing filtration system produced an $H_2SO_4$ acid solution containing toxic agglomerations (lead, oil, sulfates and particulates requiring hazardous waste designation and disposal. In addition, long before disposal time the buffered water rinse fluid lost its ability to function as an effective solvent.

A wash water filtration system was installed using the present invention. The filtration system contained several filters arranged in series, including an oil sorbent prefilter, two calcium carbonate prefilters to adjust the pH of the filtrate, two 10–20 micron prefilters, two molecular absorption filters of the present invention each containing 12 three inch diameter disks, a 1.0 micron prefilter and a 0.65 submicronic filter of the present invention.

The rinse tank contained approximately fifty gallons of rinse water and was filtered through the system at a flow rate of 4–7 gallons/minute. A pump was used to drive the filter system and provided a 50 Psi maximum differential pressure at the final stage submicronic particle filter.

Those skilled in the art may need to make minor modifications to the prefilters used in conjunction with the present invention. For example, crushed coral may be substituted for calcium carbonate to adjust the pH. In addition, the skilled artisan may need to make adjustments in the support fiber used in the oil sorbent filter media.

The filtrate produced by the invention contained less than 50 ppb heavy metals, less than 0.01% suspended solids, dissolved solids less than 1% (mainly sulfates and carbonates) with an average pH value of 6.00.

Example 14

Filtration of Seawater for a Live Specimen Transport System

During the Summer and Fall of 1992 a filtration system of the present invention was tested for the collection of specimens to be maintained in an open system, during transport operations offshore to dockside offload areas.

The filtration system contained filters arranged in series, including an oil sorbent prefilter, one 0.65 micron submicronic filter of the present invention having one 1.00 micron prefilter, two molecular absorption filters of the present invention each containing 12 disks and one 0.20 micron submicronic filter of the present invention. Over thirty-five successful specimen collection and transports were accomplished during the Summer and Fall of 1992.

A second system was tested specifically for the transport of 5–8 ft. pelagic sharks. Pelagic sharks generally do not transport successfully after collection. A number of marine biologists specializing in shark biology believe that deteriorating water quality during transport, i.e., ammonia and urea production, low dissolved oxygen levels and pheromone releases contribute to the shark's deterioration and death.

A filtration system of the present invention was tested which contained the following filters arranged in series; an oil sorbent media, one molecular absorption filter unit of the present invention containing twenty discs of 4" diameter and one 0.20 micron submicronic filter of the present invention. This system provided successful open transport, which enabled specimens to be collected in offshore waters and transported successfully to dockside areas. This system may be changed at dockside to a self-contained life support system by simple piping connection changes, the addition of a circulation pump and may be lifted off the vessel by crane for placement on a truck.

While there have been described herein what are presently believed to be the preferred embodiments of the invention, those skilled in the art will realize that changes and modifications may be made thereto without departing from the spirit of the invention and it is intended to claim all such changes and modifications as fall within the true scope of the invention.

What is claimed is:

1. A sequential single-pass, non-recirculating reverse flow filtration apparatus for high flow rate removal of organic and inorganic solutes and particulate comprising:

a first reverse flow filtration unit arranged for single-pass filtering of a liquid, said first unit having a molecular absorption filter media for removing organic and inorganic solutes, wherein said liquid flows through said molecular absorption filter media from a defined input chamber in a diffused flow path to an output chamber; and a second reverse flow filtration unit arranged downstream from and connected for fluid flow with said first unit for single-pass filtering of an entire volume of said liquid from said first unit, said second unit having a submicron filter media for removing particulate, wherein said entire volume of said liquid from said first unit flows from a defined input chamber through said submicron filter media in a diffused flow path to an output chamber;

wherein said molecular absorption filter media comprises a material formed from a composition consisting of 48 to 62 weight percent water; 10 to 18 weight percent of an aqueous solution containing 70 weight percent of a polymer consisting essentially of 60–95 weight percent of at least one alkylacrylate or alkylmethacrylate and 5–40 weight percent acrylic acid; 14 to 22 weight percent of a forty percent by weight solids, prepolymer solution; 2.5 to 7.2 weight percent of a 3 percent by volume ammonia solution; and 3.5 to 7.2 weight percent of an epoxy resin.

2. The filtration apparatus of claim 1, wherein said first filtration unit and said second filtration unit are in fluid communication with one another to allow passage of said liquid at a flow rate of greater than 40 gallons per minute at an absolute particle micron rating as low as 0.1 and a pressure differential less than 15 psi.

3. The filtration apparatus of claim 1, wherein said first filtration unit and said second filtration unit are in fluid communication with one another to remove as particulate organic and inorganic solutes having a particle size of less than 0.1 micron aggregated into particles having a size of at least 0.1 micron.

4. The filtration apparatus of claim 1, wherein said molecular absorption filter media and said submicron filter media are in fluid communication with one another and a visible color change of said at least one filter media indicates removal of a particular contaminant.

5. The filtration apparatus of claim 1, wherein said submicron filter media comprises:

a one-piece construction of a continuous matrix material having an initial micron rating of from about 1 to about 5 microns;

a hydrophilic terpolymer impregnated on said matrix material by step-wise addition of a low-viscosity terpolymeric polymerization mixture comprising from 10% to about 14% by weight of a polymer which includes at least one of alkylacrylate and alkylmethacrylate and acrylic acid; from about 17% to about 22% by weight polyethyleneimine and urea solution; from about 7% to about 10% by weight ammonia; and from about 2% to about 6% by weight epoxy resin, said polymerization mixture having a solids content of from about 15% to about 20% by weight prior to polymerization;

said step-wise addition comprising saturation of said matrix material with said terpolymeric mixture followed by compressing said saturated matrix material, and repeating said saturation and compressing at least one additional time until the saturated weight of said matrix is from about 4 to 6 times the dry weight per cubic inch of matrix; and drying said saturated matrix material in a first stage drying in which the moisture removal from the saturated matrix is from about 40 to 60% followed by a second stage drying wherein the moisture in the saturated matrix is reduced to about 2%.

6. A sequential single-pass, non-recirculating reverse flow filtration apparatus for high flow rate removal of organic and inorganic solutes and particulate comprising:

a first reverse flow filtration unit arranged for single-pass filtering of a liquid, said first unit having a molecular absorption filter media for removing Organic and inorganic solutes, wherein said liquid flows through said molecular absorption filter media from a defined input chamber in a diffused flow path to an output chamber; and a second reverse flow filtration unit arranged downstream from and connected for fluid flow with said first unit for single-pass filtering of an entire volume of said liquid from said first unit, said second unit having a submicron filter media for removing particulate, wherein said entire volume of said liquid from said first unit flows from a defined input chamber through said submicron filter media in a diffused flow path to an output chamber;

wherein said submicron filter media comprises:

a one-piece construction of a continuous matrix material having an initial micron rating of from about 1 to about 5 microns;

a hydrophilic terpolymer impregnated on said matrix material by step-wise addition of a low-viscosity terpolymeric polymerization mixture comprising from 10% to about 14% by weight of a polymer which includes at least one of alkylacrylate and alkylmethacrylate and acrylic acid; from about 17% to about 22% by weight polyethyleneimine and urea solution; from about 7% to about 10% by weight ammonia; and from about 2% to about 6% by weight epoxy resin, said polymerization mixture having a solids content of from about 15% to about 20% by weight prior to polymerization;

said step-wise addition comprising saturation of said matrix material with said terpolymeric mixture followed by compressing said saturated matrix material, and repeating said saturation and compressing at least one additional time until the saturated weight of the said matrix is from about 4 to about 6 times the dry weight per cubic inch of matrix; and drying said saturated matrix material in a first stage drying in which the moisture removal from the saturated matrix is from about 40 to about 60% followed by a second stage drying wherein the moisture in the saturated matrix is reduced to about 2%.

7. The filtration apparatus of claim 6, wherein said first filtration unit and said second filtration unit are in fluid communication with one another to allow passage of said liquid at a flow rate of greater than 40 gallons per minute at an absolute particle micron rating as low as 0.1 and a pressure differential less than 15 psi.

8. The filtration apparatus of claim 6, wherein said first filtration unit and said second filtration unit are in fluid communication with one another to remove as particulate organic and inorganic solutes having a particle size of less than 0.1 micron aggregated into particles having a size of at least 0.1 micron.

9. The filtration apparatus of claim 6, wherein said molecular absorption filter media and said submicron filter media are in fluid communication with one another and a visible color change of said at least one filter media indicates removal of a particular contaminant.

10. A high flow rate filtration method for removal of organic and inorganic solutes and particulate comprising:
contacting a liquid to be filtered in sequential single-pass, non-recirculating reverse flow with:
a first filtration unit arranged for passage of said liquid to be filtered, said first unit having a molecular absorption filter media, wherein said liquid flows through said molecular absorption filter media from a defined input chamber in a diffused flow path to an output chamber; and
a second filtration unit arranged downstream from and connected for fluid flow with said first unit, said second unit having a submicron filter media, wherein said liquid from said first unit flows from a defined input chamber through said submicron filter media in a diffused flow path to an output chamber whereby organic and inorganic solutes having a particle size of less than 0.1 micron aggregate into particles having a size of at least 0.1 micron for removal as particulate;
wherein said molecular absorption filter media comprises a material formed from a composition consisting of 48 to 62 weight percent water; 10 to 18 weight percent of an aqueous solution containing 70 weight percent of a polymer consisting essentially of 60–95 weight percent of at least one alkylacrylate or alkylmethacrylate and 5–40 weight percent acrylic acid; 14 to 22 weight percent of a forty percent by weight solids, prepolymer solution; 2.5 to 7.2 weight percent of a 3 percent by volume ammonia solution, and 3.5 to 7.2 weight percent of an epoxy resin.

11. The high flow rate filtration method of claim 10, wherein said first filtration unit and said second filtration unit are in fluid communication with one another to allow passage of said liquid at a flow rate of greater than 40 gallons per minute at an absolute particle micron rating as low as 0.1 and a pressure differential less than 15 psi.

12. The high flow rate filtration method of claim 10, wherein said molecular absorption filter media and said submicron filter media are in fluid communication with one another and a visible color change of said at least one filter media indicates removal of a particular contaminant.

13. The high flow rate filtration method of claim 10, wherein said submicron filter media comprises:
a one-piece construction of a continuous matrix material having an initial micron rating of from about 1 to about 5 microns;
a hydrophilic terpolymer impregnated on said matrix material by step-wise addition of a low-viscosity terpolymeric polymerization mixture comprising from 10% to about 14% by weight of a polymer which includes at least one of alkylacrylate and alkylmethacrylate and acrylic acid; from about 17% to about 22% by weight polyethyleneimine and urea solution; from about 7% to about 10% by weight ammonia; and from about 2% to about 6% by weight epoxy resin, said polymerization mixture having a solids content of from about 15% to about 20% by weight prior to polymerization;
said step-wise addition comprising saturation of said matrix material with said terpolymeric mixture followed by compressing said saturated matrix material, and repeating said saturation and compressing at least one additional time until the saturated weight of said matrix is from about 4 to 6 times the dry weight per cubic inch of matrix; and
drying said saturated matrix material in a first stage drying in which the moisture removal from the saturated matrix is from about 40 to 60% followed by a second stage drying wherein the moisture in the saturated matrix is reduced to about 2%.

14. A high flow rate filtration method for removal of organic and inorganic solutes and particulate comprising:
contacting a liquid to be filtered in sequential single-pass, non-recirculating reverse flow with:
a first filtration unit arranged for passage of said liquid to be filtered, said first unit having a molecular absorption filter media, wherein said liquid flows through said molecular absorption filter media from a defined input chamber in a diffused flow path to an output chamber; and
a second filtration unit arranged downstream from and connected for fluid flow with said first unit, said second unit having a submicron filter media, wherein said liquid from said first unit flows from a defined input chamber through said submicron filter media in a diffused flow path to an output chamber whereby organic and inorganic solutes having a particle size of less than 0.1 micron aggregate into particles having a size of at least 0.1 micron for removal as particulate;
wherein said submicron filter media comprises:
a one-piece construction of a continuous matrix material having an initial micron rating of from about 1 to about 5 microns;
a hydrophilic terpolymer impregnated on said matrix material by step-wise addition of a low-viscosity terpolymeric polymerization mixture comprising from 10% to about 14% by weight of a polymer which includes at least one of alkylacrylate and alkylmethacrylate and acrylic acid; from about 17% to about 22% by weight polyethyleneimine and urea solution; from about 7% to about 10% by weight ammonia; and from about 2% to about 6% by weight epoxy resin, said polymerization mixture having a solids content of from about 15% to about 20% by weight prior to polymerization;
said step-wise addition comprising saturation of said matrix material with said terpolymeric mixture followed by compressing said saturated matrix material, and repeating said saturation and compressing at least one additional time until the saturated weight of said matrix is from about 4 to 6 times the dry weight per cubic inch of matrix; and
drying said saturated matrix material in a first stage drying in which the moisture removal from the saturated matrix is from about 40 to 60% followed by a second stage drying wherein the moisture in the saturated matrix is reduced to about 2%.

15. The high flow rate filtration method of claim 14, wherein said first filtration unit and said second filtration unit are in fluid communication with one another to allow passage of said liquid at a flow rate of greater than 40 gallons per minute at an absolute particle micron rating as low as 0.1 and a pressure differential less than 15 psi.

16. The high flow rate filtration method of claim 14, wherein said molecular absorption filter media and said submicron filter media are in fluid communication with one another and a visible color change of said at least one filter media indicates removal of a particular contaminant.

\* \* \* \* \*

UNITED STATES PATENT AND TRADEMARK OFFICE
CERTIFICATE OF CORRECTION

PATENT NO. : 5,626,761
DATED : May 6, 1997
INVENTOR(S) : Howery et al.

It is certified that error appears in the above-identified patent and that said Letters Patent is hereby corrected as shown below:

<u>In Column 15, Line 44 (Table 2),</u> the patent now reads "1 $\mu$g/1-5.0 $\mu$gff1"; this should read --1 $\mu$g/1-5.0 $\mu$g\1--.

<u>In Column 16, Line 23,</u> the patent now reads "0,900-0,050"; this should read --0.900-0.050--.

<u>In Column 16, Line 24,</u> the patent now reads "0,090-0,040"; this should read --0.090-0.040--.

Signed and Sealed this

Fifth Day of August, 1997

Attest:

BRUCE LEHMAN

*Attesting Officer*          *Commissioner of Patents and Trademarks*